United States Patent [19]

Brandeberry et al.

[11] 4,038,105
[45] July 26, 1977

[54] RADIATION SHIELDS FOR ASPIRATING PYROMETERS

[75] Inventors: Raymond L. Brandeberry, Toledo; Glen J. Lehr, Oregon; Denzil W. Stacy, Toledo, all of Ohio

[73] Assignee: Libbey-Owens-Ford Company, Toledo, Ohio

[21] Appl. No.: 620,717

[22] Filed: Oct. 8, 1975

[51] Int. Cl.$^2$ ............................................. H01L 35/02
[52] U.S. Cl. ................................... 136/231; 73/349; 136/242
[58] Field of Search ................... 136/231, 242; 73/349

[56] References Cited
U.S. PATENT DOCUMENTS

| 2,931,227 | 4/1960 | Werner et al. | 136/231 |
| 2,970,475 | 2/1961 | Werner | 73/349 |

Primary Examiner—Maynard R. Wilbur
Assistant Examiner—Richard E. Berger
Attorney, Agent, or Firm—Collins, Oberlin & Darr

[57] ABSTRACT

An improved heat shield for shielding a sheathed thermocouple from heat radiating from or to surrounding bodies having temperatures different from the temperatures of hot gases which are being measured by the thermocouple. The improved shield generally is comprised of two elements, namely, (1) an elongated refractory member having an axially extending central passage for receiving the thermocouple and a plurality of parallel passages surrounding the central passage and (2) a flanged tubular holder for attaching the refractory member to one end of a water cooled probe. The refractory member is constructed of a large diameter thin wall refractory tube which is bonded to the flanged holder and houses a plurality of small diameter thin walled refractory tubes which are bonded to the inner surface of the large tube. The tubes collectively and individually define the central and parallel passages. The inner surface of the flanged tubular holder is provided with an abutment for retaining the large and small tubes in their longitudinally assembled positions relative to each other in case of failure of the bond without blocking the passages defined by the tubes.

6 Claims, 4 Drawing Figures

RADIATION SHIELDS FOR ASPIRATING PYROMETERS

BACKGROUND OF THE INVENTION

1. Field of the Invention

This invention generally relates to the measurement of temperatures and more particularly, relates to heat shields employed in instruments used in the measurement of high temperatures of gases such as those encountered in glass melting furnaces.

2. Description of the Prior Art

It is desirable in the glass making industry to measure accurately the temperatures of the gases at different locations in the overall system of producing glass, particularly the gas temperatures in a melting furnace occuring at its ports, regenerators tunnels, flues, chimney and ejectors. measured under actual operating conditions, the temperatures serve as bases for improvements in operations, modifications in design, and fuel and power savings. As a result, longer furnace life, higher tonnages, improved quality, and lower costs for the production of glass may be achieved.

In a conventional glass melting tank furnace, fuel is alternately fired, using preheated combustion air, from one side and then the other through a series of ports along each side of the tank at right angles to the flow of molten glass. The raw materials are continually fed at one end of the tank and molten glass is removed from its other end. The variations and conditions at the various ports down each side of the tank are therefore important in determining the variations in temperature undergone by the raw materials during melting and the glass after melting.

In such glass melting furnace systems, the temperature of the combustion air and exhaust gases may be substantially different from the temperature of the surrounding bodies, and the heat exchanged by radiation between the bodies and the temperature measuring instrument may predominate over that exchanged by convection. The exchange of heat by radiation from or to the adjacent bodies can influence the instrument reading so that it may indicate the temperature of such bodies or some temperature intermediate that of the bodies and the combustion air or exhaust gases rather than the true temperature of these gases.

Generally, in the above-mentioned environment a sheathed thermocouple is employed to measure the temperature of a gas. As is known, a thermocouple indicates its own temperature and if it is to determine that of a gas, its hot junction must attain the temperature of the gas. In the case of the sheathed thermocouple, the surface of the sheath receives heat from the gas by convection. This heat then passes through the sheath to the hot junction of the thermocouple, but at the same time the sheath exchanges heat by radiation with the surrounding bodies and loses heat by conduction therealong. Hence, the temperature reached by the hot junction of the thermocouple may be different from the true temperature of the gas, particularly when temperatures above 1400° C. (2550° F.) are encountered.

Thus, in order to measure accurately temperatures of hot gases whose temperatures are different from those of their surroundings, aspirating pyrometers are conventionally employed. As is known, as aspirating pyrometer is an instrument wherein the convective heat transfer to a sheathed thermocouple from a gas is increased by drawing the gas over it at high velocity and at the same time shielding the thermocouple from heat radiating to or from the surrounding bodies so that the temperature of the hot junction of the thermocouple will be substantially the same as the temperature of the gas it is sensing.

In the past it has been proposed to construct a heat shield from standard thin wall refractory tubing. Generally speaking, this type of shield construction comprises a large diameter tube housing a series of small diameter tubes which are circumferentially arranged around and bonded to the inside surface of the large tube. In assembling this type of radiation shield, it is important that the small tubes hold the same relative position both with respect to each other and the large tube so that the transmission of heat to or from the sheathed thermocouple by the gases being sensed remains uniform. In the past, this has been accomplished by filling in the spaces defined by the inside surface of the large tube and the outside surface of the small tubes with a refractory cement. Thus, this form of construction merely provides a simple system consisting of, in effect, a refractory block having a central passage surrounded by a single series of parallel passages. Although bonding may hopefully be improved, it is at the expense of reduced pyrometer efficiency because passage of gas through the passages formed by the outside surface of the small tubes in conjunction with the inside surface of the large tubes is blocked. Too frequently, in this shield construction, the cement bond fails and the small tubes are drawn longitudinally from their original positions by action of the induced gas flow. This results in the disadvantages of (1) loss of calibration of the thermocouple, (2) possible loss of the thermocouple sheath and even the thermocouple junction, (3) loss of time in repeating the masurements, (4) costly loss of the heat shield and (5) loss of time in dismounting and remounting a new heat shield to a probe.

SUMMARY OF THE INVENTION

Generally speaking, the improved heat shield constructed in accordance with this invention overcomes the aforementioned disadvanages by providing means in the tubular shield holde for retaining the tubes in their originally assembled relationship in the event of failure of the bond between the tubes, but which at the same time permits free flow of the aspirated gas stream through all the passages defined by the tubes. To this end, the tube holder is provided with a retaining ring or mechanical stops positioned closely adjacent to the downstream end of the tubes so that in the event of failure of the bond between the small and the large tube and the large tube and the tubular holder, the tubes will abut the retaining ring or stops and be held in their original positions.

OBJECTS AND ADVANTAGES

An object of this invention is to provide a heat shield which is simple in construction efficient in operation and effective in shielding a thermocouple from radiant heat so that the temperature of the hot junction of the thermocouple is substantially the same as the temperature of the gas it is sensing.

Another object of this invention is to provide a heat shield wherein all the passages defined by the large and small tubes remain open, thus resulting in a highly efficient pyrometer.

Yet another object is to provide a heat shield composed of individual elements whih are easily assembled and requires a minimum amount of bonding cement, thus having a small heat sink capacity.

Still another object is to provide a heat shield wherein the component elements are retained in their originally assembled relatonship in event of failure of the cement bond.

Other objects and advantages of the invention will become more apparant during the course of the following description when read in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENT

Figure 1:
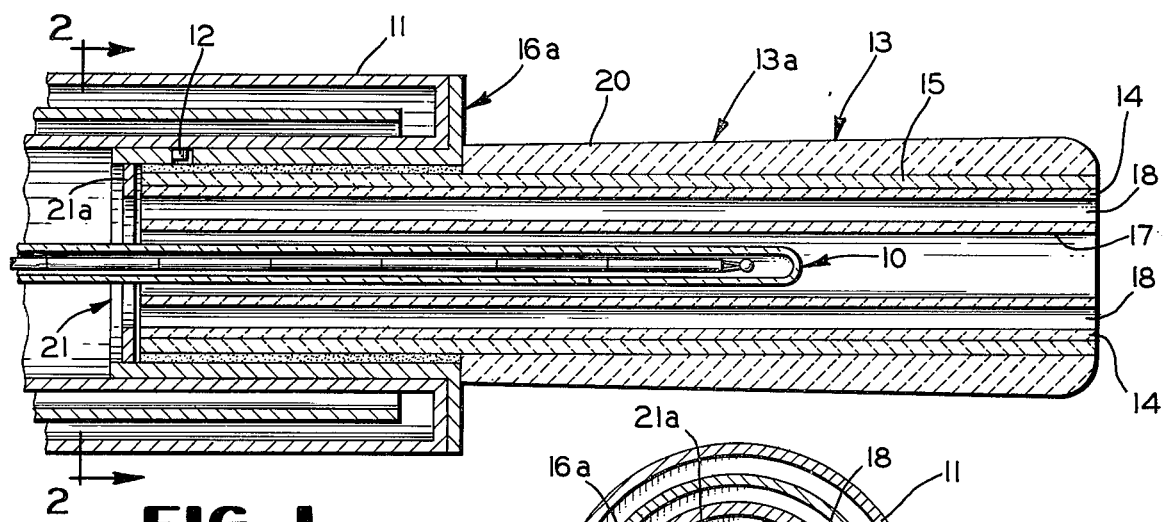
FIG. 1 is a fragmentary longitudinal sectional view of a thermocouple and water cooled probe together with a heat shield constructed in accordance with the invention.
Figure 3:
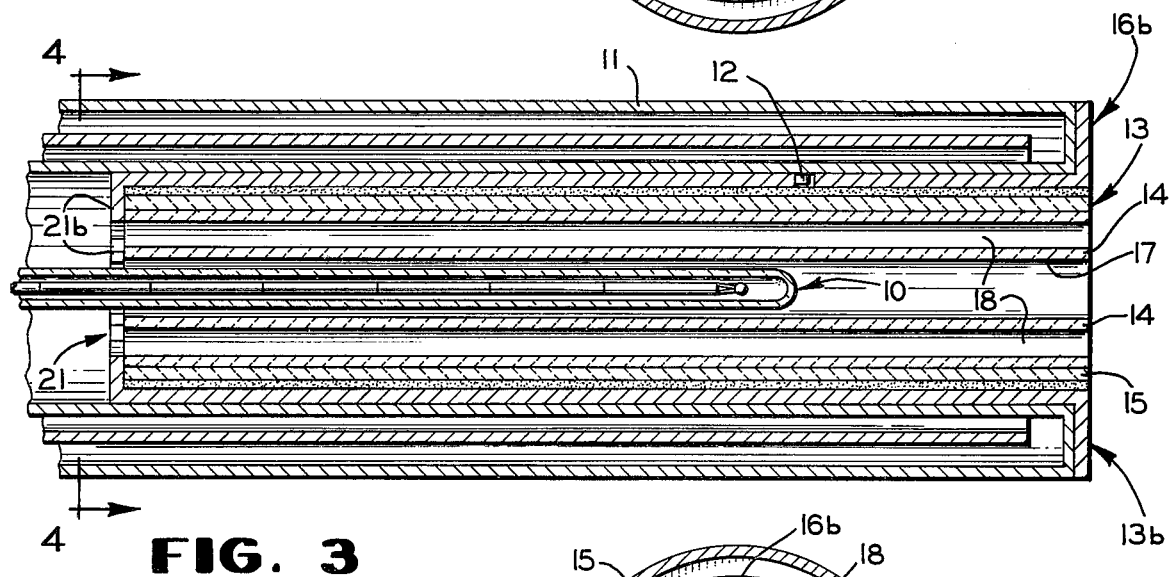
FIG. 3 is a longitudinal sectional view similar to FIG. 1, but illustrating another embodiment of the invention.

Referring to FIGS. 1 and 3, a sheathed thermocouple 10 is combined with an aspirating device (not shown) to form an aspirating pyrometer such as shown in the pending United States patent application Ser. No. 416,017, filed on Nov. 15, 1973 now U.S. Pat. No. 3,935,032, issued on Jan. 27, 1976 by the same inventors. Generally, the aspirating pyrometer includes a water cooled tubular probe 11 at the forward end of which is detachably mounted, as by a bayonet fastener 12, a radiation heat shield assembly constructed in accordance with this invention and indicated generally by the reference numeral 13. As is known the radiation heat shield is a primary part of the aspirating pyrometer and to be effective, it must remain intact and in postition during calibration of the thermocouple and during its measurement of a gas stream temperature.

Figure 2:
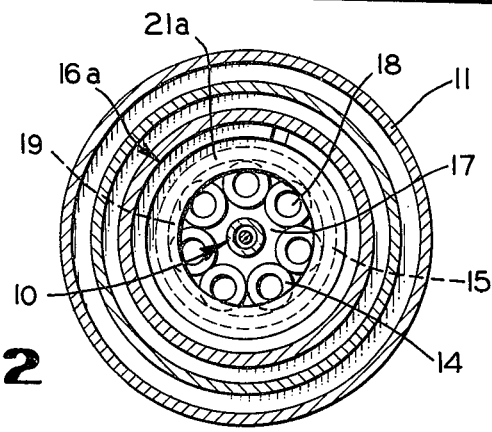
FIG. 2 is a cross sectional view taken substantially along line 2—2 in FIG. 1, illustrating the improved heat shield.
Figure 4:
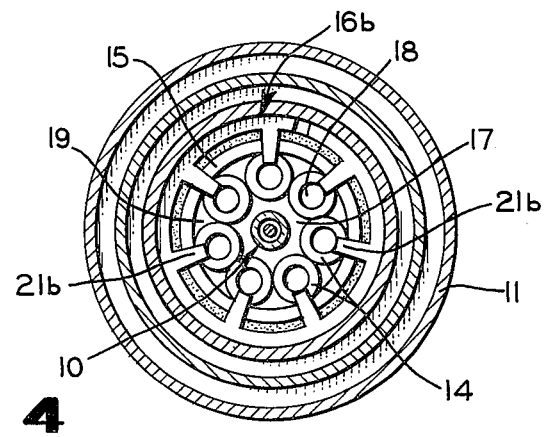
FIG. 4 is a cross sectional view taken substantially along line 4—4 in FIG. 3.

As illustrated in FIGS. 1 and 3, the shield assembly 13 generally comprises a series (in this case seven) of small diameter, thin wall refractory tubes 14 composed of alumina, mullite, or other refractory ceramic material, which are circumferentially arranged around and bonded by a refractory cement to the inside surface of a large diameter tube 15 of the same material. The large tube 15, in turn, is bonded to the inside surface of a flanged metal tubular holder indicated generally by the reference numerals 16a or 16b. As best illustrated in FIGS. 2 and 4, the small diameter tubes 14 define a central passage 17, a first series of parallel passages 18 and, together with the large tube 15, a second series of parallel passages 19 for the flow of the aspirated gas stream therethrough. The size of the small diameter tubes is proportioned with respect to the inside diameter of the large tube 15 so that when they are assembled within the large tube 15 they lock themselves around the inside surface thereof.

COnventionally, there are two basic types of heat shields used with aspirating pyrometers employed in the glass industry, first, an externally mounted shield assembly 13a as illustrated in FIG. 1 for measuring gas temperatures above about 1400° C., and second, an internally mounted shield assembly 13b as illustrated in FIG. 3 for measuring temperatures below about 1400° C. Preferably it is desirable to use the shield assemblies for masuring the temperature ranges as described. However, they, depending on the type of material employed in their construction, may be interchanged in practice. Thus, in the embodiment of the invention illustrated in FIG. 1, the flanged tubular holder 16a is "short coupled" so that approximately two-thirds of the overall length of the refractory tubes 14 and 15 extend outside of the holder for direct insertion into a gas stream when it is attached to the probe 11, while in the embodiment shown in FIG. 3, the tubular holder 16b extends along the length of the refractory tubes 14 and 15 for positioning the tubes within the probe 11.

Referring specifically to the heat shield assembly 13a illustrated in FIG. 1, the outsie surface of the large diameter tube 15 is covered with a coating of castable cement or, preferably, by a shell 20 of silicon carbide which is telescopically receied over the large tube 15 and is then bonded thereto by a cement for protection of the refractory tubes 14 and 15 against thermal shoc and/or mechanical breakage. In this embodiment of the invention the direct flow of radiant heat from the surrounding bodies to the sheathed thermocouple 10 now takes place at the outside surface of the protective shell 20 on the large diameter tube 15. The plurality of small tubes 14 then exchange heat with the inside surface of the large tube 15. The plurality of small tubes 14 further exchange heat by convection with the aspirated gas stream through the passages 18 and 19. Thus, the walls of the small tubes 14 defining the central passage 17 are at aproximately the same temperature as the sheathed thermocouple 10.

In the embodiment of the invention shown in FIG. 3, the direct flow of radiant heat from the surrounding bodies to the sheathed thermocouple 10 first takes place through the water cooled probe 11 and the tubular holder 16b, otherwise the flow of radiant heat through the heat shield assembly 13b is the same as previously described for the heat shield assembly 13a.

As previously mentioned, it is improtant that the small diameter tubes 14 hold the same relative position with respect to each other and the large diameter tube 15 particularly when a high velocity gas stream is aspirated through the passages defined by the tubes 14 and 15.

To this end, each holder 16a or 16b includes a retaining ring or mechanical stops 21 to retain the tubes in their longitudinally assembled positions relative to each other in event of failure of their cemented bonds. Thus, as shwon in FIGS. 1 and 2, the holder 16a is provided with a ring 21a adjacent the downstream end of the tubes 14 and 15 to limit longitudinal movement of the tubes. The insie diameter of the ring 21a is small enough to effectively prevent movement of the small tubes 14 relative to the large tube 15 but sufficiently large to allow the flow of gases through and around the tubes 14. Thus, all the surfaces of the tubes 14 are heated by the hot gases and, in turn, shield the thermocouple 10 from heat raditing to or from the surrounding bodies. The ring may be attached to the inside surface of the tubular holder 16a, for example, by spot welding the ring at at least three points for minimizing warpage thererof.

In the embodiment of the invention shown in FIGS. 3 and 4l the downstream end of the holder 16b is provided with tabs 21b formed from the cylindrical surface of the holder 16b. The tabs are "crimped" over so that they project radially inward from the body of the holder closely adjacent the ends of the small tubes 14. In all cases, the ring 21a or tabs 21b extend radially into the interior of the holder only enough to prevent the refractory tubes 14 and 15 from moving longitudinally relative to each other. Thus, maximum area is left open for the gases to be aspirated through the passages.

From the foregoing, it can be seen that an improved heat shield assembly has been provided having the advantages that (1) the passages remain open for high efficiency of the pyrometer because of uniform heating of the refractory tubes which shield the thermocouple against rediation, (2) the refractory tubes remain in place even if the cement bonding them together should fail, and (3) thermal shock is prevented in the shields, particularly in the internally mounted shield wherein previous designs frequently broke at the end of the metal holder where part of the refractory tubes were surrounded by the metal holder, and the other part was exposed directly to the water cooled probe.

It is to be understood that the forms of the invention herewith shown and desicribed are to be taken as illustrative embodiments only of the same and that various changes in the shape, size and arrangement of the parts may be resorted to without departing from the spirit of the invention.

We claim:
1. A heat shield for shielding a thermocouple of an aspirating pyrometer from radiant heat comprising:
   a. an elongated first refractory tube;
   b. a series of second elongated refractory tubes of smaller diameter circumferentially arranged around and bonded to the inside surface of said first tube forming a central passage and a series of parallel passages surrounding the central passage;
   c. a tubular holder bonded to said first tube for attaching said refractory tubes to the aspirating pyrometer; and
   d. means attached to said holder at the downstream end of said refractory tubes for preventing longitudinal movement of said second tubes in the event of failure of the bond cementing said tubes to each other and to said holder.

2. A heat shield for shielding a thermocouple as claimed in claim 1, wherein said refractory tubes are at least partially encased within said tubular holder and said means attached to said holder project radially inwardly within said holder for forming an abutment just wide enough to contact the ends of said tubes without blocking the parallel passages surrounding the central passage.

3. A heat sheild for shielding a thermocouple as claimed in claim 2, wherein said means attached to said holder is closely spaced downstream from and adjacent the ends of said refractory tubes.

4. A heat shield for shielding a thermocouple as claimed in claim 2, wherein said second tubes form the central passage, a first series of parallel passages through said second tubes and together with said first tube, a second series of parallel passages surrounding the first series of parallel passages and said means attached to said holder contacts the ends of said tubes without blocking the first and second series of parallel passages.

5. A heat shield for shielding a thermocouple as claimed in claim 2, wherein said means attached to said holder comprises a ring.

6. A heat shield for shielding a thermocouple as claimed in claim 2, wherein said means attached to said holder comprises a series of tabs.

* * * * *